United States Patent
Miyata et al.

(10) Patent No.: US 9,456,188 B2
(45) Date of Patent: Sep. 27, 2016

(54) LIGHT SOURCE APPARATUS AND PROJECTOR HAVING LIGHT SOURCE APPARATUS

(71) Applicant: NICHIA CORPORATION, Anan-shi, Tokushima (JP)

(72) Inventors: Tadaaki Miyata, Yokohama (JP); Hidenori Matsuo, Hadano (JP)

(73) Assignee: NICHIA CORPORATION, Anan-shi (JP)

( * ) Notice: Subject to any disclaimer, the term of this patent is extended or adjusted under 35 U.S.C. 154(b) by 0 days.

(21) Appl. No.: 14/838,466

(22) Filed: Aug. 28, 2015

(65) Prior Publication Data
US 2016/0065919 A1    Mar. 3, 2016

(30) Foreign Application Priority Data
Aug. 29, 2014 (JP) ................. 2014-176354

(51) Int. Cl.
| | |
|---|---|
| *H04N 9/31* | (2006.01) |
| *G02B 26/00* | (2006.01) |
| *G03B 21/16* | (2006.01) |
| *G02B 21/20* | (2006.01) |

(Continued)

(52) U.S. Cl.
CPC ........... *H04N 9/3111* (2013.01); *G02B 26/008* (2013.01); *G03B 21/16* (2013.01); *G03B 21/204* (2013.01); *G03B 21/2006* (2013.01); *G03B 21/2013* (2013.01); *G03B 21/2046* (2013.01); *H04N 9/3158* (2013.01); *G02B 27/30* (2013.01)

(58) Field of Classification Search
CPC  H04N 9/3111; H04N 9/3114; H04N 9/3117; H04N 9/3161; G03B 21/2046; G03B 21/204; G03B 21/2033
See application file for complete search history.

(56) References Cited

U.S. PATENT DOCUMENTS

| | | |
|---|---|---|
| 2012/0133903 A1 | 5/2012 | Tanaka |
| 2012/0249972 A1 | 10/2012 | Kurosaki |

(Continued)

FOREIGN PATENT DOCUMENTS

| | | |
|---|---|---|
| EP | 2 610 979 A2 | 7/2013 |
| JP | 2011-133782 A | 7/2011 |

(Continued)

OTHER PUBLICATIONS

European Search Report application No. 15182693.0 issued Jan. 28, 2016.

*Primary Examiner* — William C Dowling
(74) *Attorney, Agent, or Firm* — Squire Patton Boggs (US) LLP

(57) ABSTRACT

A light source apparatus and a Projector including the light source apparatus are provided. The light source apparatus comprises: a plurality of light sources each including a laser diode and a collimating lens, said collimating lens making a light emitted from said laser diode into an approximately collimated beam, a plurality of housings in which said plurality of light sources are placed so that a light is emitted from each of said light source advances approximately in parallel in the same direction, a condenser lens which condenses lights which is emitted from said plurality of housings to a phosphor, a phosphor wheel having said phosphor, said phosphor wheel transmitting the lights which is emitted from said condenser lens, wherein incident angles of the lights emitted from said housings to an optical axis of said condenser lens are made different by varying mount angles of said housings to a supporting member.

12 Claims, 7 Drawing Sheets

(51) Int. Cl.
*G03B 21/20* (2006.01)
*G02B 27/30* (2006.01)

(56) References Cited

U.S. PATENT DOCUMENTS

| | | | |
|---|---|---|---|
| 2013/0070215 A1 | 3/2013 | Higo | |
| 2014/0078472 A1 | 3/2014 | Masuda et al. | |
| 2014/0211170 A1 | 7/2014 | Kitano et al. | |
| 2015/0109584 A1* | 4/2015 | Murai | H04N 9/3114 353/31 |
| 2015/0316840 A1* | 11/2015 | Maeda | H04N 9/3158 353/31 |
| 2016/0062221 A1* | 3/2016 | Matsubara | G03B 21/2013 353/31 |
| 2016/0077417 A1* | 3/2016 | Ishikawa | G03B 21/2013 353/20 |
| 2016/0131967 A1* | 5/2016 | Saitou | F21V 5/008 353/31 |

FOREIGN PATENT DOCUMENTS

| | | |
|---|---|---|
| JP | 2011-191466 A | 9/2011 |
| JP | 2012-215633 A | 11/2012 |
| JP | 2013-073080 A | 4/2013 |
| JP | 2014-062951 A | 4/2014 |
| JP | 2014-123518 | 7/2014 |

* cited by examiner

Sectional View
seen from Arrow A-A

Not Inclined

Side view seen from Arrow B-B

Inclined + Rotated (0, 180 Degrees)

Side view seen from Arrow C-C

Inclined + Rotated (0, 90, 180, 270 Degrees)

Collimate Lens at Focusing Position

Sectional View

Collimate Lens shifted from Focusing Position

Collimate Lens at Focusing Position

Converged Shape | Light Intensity Distribution (Sectional Light Intensity)

Collimate Lens shifted from Focusing Position

Converged Shape | Light Intensity Distribution (Sectional Light Intensity)

Incident Surface Side

Exist Surface Side

LIGHT SOURCE APPARATUS AND PROJECTOR HAVING LIGHT SOURCE APPARATUS

CROSS-REFERENCE TO RELATED APPLICATIONS

The present application claims priority under 35 U.S.C. §119 to Japanese Patent Application No. 2014-176354, filed on Aug. 29, 2014. The content of this application is incorporated herein by reference in their entirety.

BACKGROUND OF THE INVENTION

1. Field of the Invention

The disclosure relates to a light source apparatus and a projector having the light source apparatus.

2. Description of the Related Art

Recently, a time divisional type projector has become popular. The time divisional type projector emits lights of a plurality of wavelengths and forms images by modulating the emitted lights of the plurality of wavelengths sequentially, and then projects the formed images. As a light source apparatus used for the time divisional type projector, for example, there is known a light source apparatus having a light source that outputs a white light, and a rotating wheel to which a plurality of color filters are attached. According to such light source apparatus, the light source emits the white light to the rotating wheel which rotates at constant speed, and thereby emitting lights of a plurality of wavelengths (such as blue, green and red lights) in a time divisional manner.

Further, there is also proposed a light source apparatus including a light source that outputs a light of a single wavelength, such as a laser diode, and a rotating wheel having phosphor layers instead of color filters. According to such light source apparatus, the light source emits the light of a single wavelength to the rotating wheel which rotates at constant speed, and thereby emitting lights of a plurality of wavelengths in a time divisional manner. For example, it is possible to convert wavelength of a blue light from a laser diode into that of a green or red light by using phosphors. In such light source apparatuses, as described in JP 2011-133782 A, there is proposed a method to enlarge an approximately oval shape of a light which is emitted from a laser light source and condensed onto the phosphors by installing the laser light source rotated around its optical axis, and thereby making uniform brightness for projecting.

As described in JP 2012-215633 A, there is proposed a method to change a position of the light condensed position of each laser light source on the phosphor by varying distances of the plurality of laser light sources and distances of collimator lenses located at the output side of the laser light sources, and thereby exciting the phosphors with a low light intensity.

According to the light source apparatus described in JP 2011-133782 A, the rotating direction of each laser diode needs to be adjusted in the case of rotating the laser diode around the optical axis. Further, since a light emitted from each laser light source is condensed onto the same position, the light intensity at the light condensed point may be so high that the emission efficiency of phosphor is reduced. According to the light source apparatus described in JP 2012-215633, a position of a light condensed position of each laser light source can be changed. However, as a diameter of the light condensed position formed by a parallel light from the collimator lens is small, the light intensity of a parallel light from the collimator lens is high, so that the emission efficiency of phosphor may be reduced.

SUMMARY OF THE INVENTION

One aspect of the light source apparatus according to the present invention is a light source apparatus comprising:

a plurality of light sources each including a laser diode and a collimating lens, said collimating lens making a light emitted from said laser diode into an approximately collimated beam, a plurality of housings in which said plurality of light sources are placed so that each light emitted from each of said light source advances approximately in parallel in the same direction, a condenser lens which condenses lights emitted from said plurality of housings to a phosphor, a phosphor wheel having said phosphor, said phosphor wheel transmitting a light which is emitted from said condenser lens, wherein incident angles of the lights emitted from said housings to an optical axis of said condenser lens are made different by varying mount angles of said housings to a supporting member.

One aspect of the projector according to the present invention is a projector comprising:

the light source apparatus according to the above mentioned aspect, a light modulating device which modulates lights emitted from the light source apparatus in the plurality of wavelength ranges to form an image based on an image data, a projecting device which enlarges and projects the images.

DESCRIPTION OF EMBODIMENTS

Figure 1A:
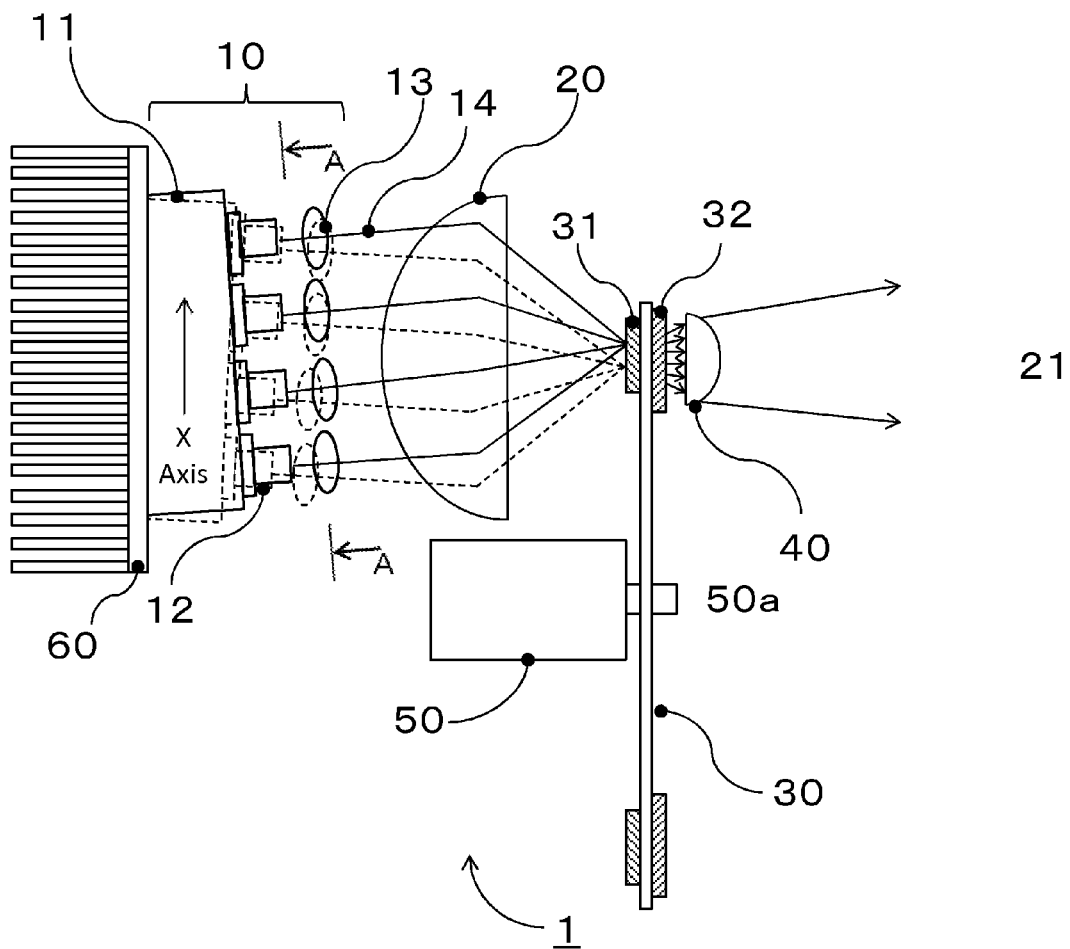
FIG. 1 A illustrates a schematic diagram of a light source apparatus and FIG. 1 B illustrates an explanatory diagram of an optical axis for describing a light source apparatus according to one embodiment of the present invention.

The light source apparatus according to Aspect 1 of the present invention is a light source apparatus comprising:

a plurality of light sources each including a laser diode and a collimating lens, said collimating lens making a light emitted from said laser diode into an approximately collimated beam, a plurality of housings in which said plurality of light sources are placed so that each light emitted from each of said light source advances approximately in parallel in the same direction, a condenser lens which condenses lights emitted from said plurality of housings to a phosphor, a phosphor wheel having said phosphor, said phosphor wheel transmitting a light which is emitted from said condenser lens, wherein incident angles of the lights emitted from said housings to an optical axis of said condenser lens are made different by varying mount angles of said housings to a supporting member.

According to this aspect, lights emitted from the plurality of housings are condensed onto different positions on the phosphor wheel (that is "on the phosphor") by the condenser lens. Therefore, a light intensity at the light condensed position on the phosphor can be lowered, so that a light which is emitted from the phosphor can be used efficiently.

Further, since the above mentioned effect can be achieved by simply varying the angles of mounting the housings to the supporting member, the light source apparatus can be manufactured without lowering the productivity.

Accordingly, it is possible to provide the light source apparatus which can suppress degradation of the emission efficiency of phosphor as much as possible, and can be manufactured without lowering the productivity with achieving simple assembly.

The light source apparatus according to Aspect 2 of the present invention is the light source apparatus according to the above mentioned Aspect 1, wherein, in said light source, a location of said collimating lens to said laser diode is shifted from a position of said collimating lens to emit a collimated light.

According to this aspect, in each light source, since a light which is emitted from the collimating lens becomes different from the parallel light by shifting the location of the collimating lens with respect to the laser diode, a diameter of the light condensed position on the phosphor can be enlarged, while a shift of the location of the light condensed positions formed by the lights from the plurality of the laser diodes can be made smaller.

Thus, while lights from the laser diodes placed in the same housing are condensed onto the approximately same place, a light intensity can be lowered by enlarging the area of the light condensed position.

Accordingly, since a light intensity of the light condensed position can be lowered, a light which is emitted from the phosphor can be used efficiently. At the same time, since there is little deviation in the location of the light condensed positions of the laser diodes placed in the same housing, increase of the area of total condensed positions can be adequately reduced.

Additionally, by combining the Aspects 1 and 2, since lights from the plurality of housings are condensed onto different positions respectively, and the area of the light condensed positions formed by the lights from each housing is large enough, a light density can sufficiently be lowered, and thus the degradation of the emission efficiency of phosphor can be sufficiently suppressed.

The light source apparatus according to Aspect 3 of the present invention is the light source apparatus according to the above mentioned Aspect 1 or 2, wherein, in said housing, said light sources are aligned in a short axis of a far field pattern of said laser diode, and the mount angles of said housings are varied in the direction of rotating around a long axis of a far field pattern of said laser diode.

According to this aspect, in the housing, since each of the light sources is aligned in the short axis of the far field pattern of the laser diode, and the mount angles of the housings are varied in the direction of rotating around the long axis of the far field pattern of the laser diode, a light emitted from each light source can be prevented from interfering with each other, and thus the light density at the light condensed position can be lowered adequately.

The light source apparatus according to Aspect 4 of the present invention is the light source apparatus according to any one of the above mentioned Aspects 1 to 3, wherein said housings are mounted on the same supporting member, and mounted surfaces of said housings to said supporting member are slanted.

According to this aspect, only by simply making slanted the mounted surfaces of the housings to the supporting member, a light density of the light condensed position can securely be lowered, and thus the light source apparatus can be manufactured without lowering the productivity.

The light source apparatus according to Aspect 5 of the present invention is the light source apparatus according to the above mentioned Aspect 4, wherein two of said housings being adjacent to each other are fixed to said supporting member with rotating by 180 degrees to each other approximately around an optical axis of the light emitted from said housings.

According to this aspect, fixing the housings having slanted mounted surfaces and having the same shape with each other to the supporting member so as to rotate by 180 degrees to each other, (in other words, rotating by 180 degrees in the same rotating direction) allows the incident angle of the light which is emitted from each housing with respect to an optical axis of the condenser lens to be made different. Therefore, it can certainly lower a light density at the light condensed position by using very simple configuration.

The light source apparatus according to Aspect 6 of the present invention is the light source apparatus according to the above mentioned Aspects 4, wherein four of said housings being adjacent to one another are fixed to said supporting member with rotating by 90 degrees to one another around approximately an optical axis of the light emitted from said housings.

According to this aspect, fixing the housings having slanted mounted surfaces and having the same shape with each other to the supporting member so as to rotate by 90 degrees to others, (in other words, rotating by 90, 180, 270 degrees in the same rotating direction) allows the incident angle of the light emitted from each housing to an optical axis of the condenser lens to be made different. Therefore, it can certainly lower the light density at the light condensed position by using very simple configuration.

The light source apparatus according to Aspect 7 of the present invention is the light source apparatus according to any one of the above mentioned Aspects 1 to 3, wherein said housings are mounted on the same supporting member, and a mounting surface of said supporting member on which said housings are mounted is slanted.

According to this aspect, by making slanted the mounting surface of the supporting member on which the housings are mounted, the incident angle of the light emitted from each housing to an optical axis of the condenser lens is made different. Therefore, once the supporting member is formed having the slanted mounting surface, a shape of the housing can be simplified so that the housing can be replaced easily with a low cost in the time of maintenance or the like.

The light source apparatus according to Aspect 8 of the present invention is the light source apparatus according to any one of the above mentioned Aspects 4 to 7, wherein the slant angle of the mounted surface of said housing or the mounting surface of said supporting member is in a range from 0.25 to 2 degrees.

According to this aspect, since the slant angle ranges from 0.25 to 2 degrees, the degradation of the emission efficiency of phosphor can be suppressed without enlarging the area of the light condensed position so much.

The light source apparatus according to Aspect 9 of the present invention is the light source apparatus according to any one of the above mentioned Aspects 1 to 8, wherein the supporting member works as a heat dissipation member.

According to this aspect, since the supporting member works as a heat dissipation member, the housing can be cooled efficiently, and downsizing of the light source apparatus with reducing the number of components can be facilitated.

The light source apparatus according to Aspect 10 of the present invention is the light source apparatus according to any one of the above mentioned Aspects 1 to 9, wherein one of said phosphors is a phosphor which emits a light including a red light.

The light source apparatus according to Aspect 11 of the present invention is the light source apparatus according to any one of the above mentioned Aspects 1 to 10, wherein the wavelength of lights emitted from said housings is in a range from 370 to 500 nm.

The projector according to Aspect 1 of the present invention is a projector comprising:

the light source apparatus according to any one of Aspects 1 to 11 of the light source apparatus, a light modulating device configured to modulates lights which are emitted from the light source apparatus in the plurality of wavelength ranges to form an image based on an image data, a projecting device which enlarges and projects the images.

According to this aspect, it is possible to provide the projector which can suppress degradation of the emission efficiency of phosphor as much as possible, and can be manufactured without lowering the productivity with achieving simple assembly.

Next, a light source apparatus and a projector having the light source apparatus according to embodiments of the present invention will be described in detail with referring to the attached drawings.

(General Description of Light Source Apparatus)

Figure 1B:
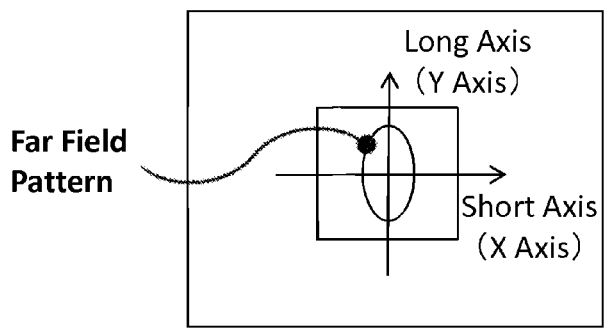

At first, a light source apparatus according to one embodiment of the present invention is described with referring to FIG. 1. FIG. 1A illustrates a schematic diagram of the light source apparatus and FIG. 1B illustrates an explanatory diagram of a short axis and a long axis of a far field pattern of said laser diode (a sectional view seeing from Arrow A-A) for describing the light source apparatus according to one embodiment of the present invention. As illustrated in FIG. 1A, the light source apparatus 1 according to this embodiment includes housings 10 which act as a light source position, a condenser lens 20, a phosphor wheel 30, a receiving lens 40, a rotary driving apparatus 50 and a heat dissipation plate 60.

In this embodiment, blue lights are emitted from the housings 10, and the emitted blue lights enter the condenser lens 20.

The lights are converted by the converting lens 20 (details are described later), and then enters the phosphor wheel 30 which is rotated by the rotary driving apparatus 50. The phosphor wheel 30 is formed by a material which transmits a light. A dielectric film 31 is formed on a light-incident surface of the phosphor wheel 30 concentrically, and a phosphor 32 is formed on light-emitting surface of the phosphor wheel 30 concentrically. In more detail, a green phosphor region, a red phosphor region and a blue-light transmissive region are formed on the light-emission surface of the phosphor wheel 30 concentrically. The green phosphor emits a green light when a blue light enters the green phosphor, and the red phosphor emits a red light when a blue light enters the red phosphor. Therefore, when a blue light from the condenser lens 20 enters the phosphor wheel 30, a green light, a red light and a blue light is emitted from the phosphor wheel 30 in a time divisional manner, and enter the receiving lens 40. Then, the light is condensed by the receiving lens 40, and is outputted from the light source apparatus 1.

A wavelength of the emitted lights of the laser diodes 12 used in this embodiment is preferably in a range from 370 to 500 nm, and more preferably from 420 to 500 nm.

The plurality of housings 10 are fixed to a mounting surface of the heat dissipation plate 60 which is a supporting member. In FIG. 1, one housing 10 is illustrated in a solid line and another housing 10 is illustrated in a dotted line. Each of the housings 10 is configured such that a plurality of laser diodes 12 which emit blue lights, and a plurality of collimating lenses 13 which make lights emitted from the laser diode 12 into approximately parallel lights are placed in a main body 11 of the housing 10. In each housing 10, the laser diodes 12 and the collimating lenses 13 are arranged such that a light is emitted from each of the laser diodes 12 in approximately parallel in the same direction. Each housing 10 is fixed to the heat dissipation plate (supporting member) 60 with varying a mount angle of each housing 10 with respect to the heat dissipation plate 60 (Refer to the housing 10 of the solid line and the housing 10 of the dotted line comparatively). Therefore, an optical axis 14 of the light which is emitted from each housing 10 is not parallel to an optical axis 21 of the condenser lens 20, and thus the light from each housing 10 enters the condenser lens 20 with a different incident angle respectively. Accordingly, as illustrated by the solid line and the dotted line in FIG. 1, although the light is condensed onto the position on the phosphor wheel 30 by the condenser lens 20, the light from each housing 10 is condensed onto different positions on the phosphor wheel 30 respectively. In FIG. 1, although it is illustrated such that the light is condensed onto a surface of the dielectric film 31 formed on the light-incident surface of the phosphor wheel 30, it is possible to describe "the light is condensed onto different positions on the phosphor 32" because the dielectric film 31 is very thin and the light is not condensed nor diffused on the phosphor wheel 30.

The embodiment relating to the housing will be described in detail later.

Figure 5A:
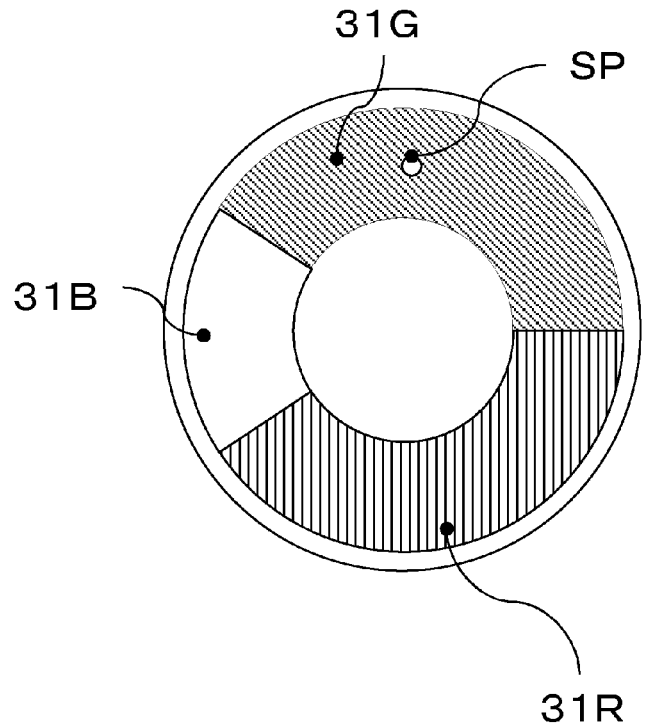
FIGS. 5A to 5B illustrates a schematic diagram for describing a phosphor wheel according to one embodiment of the present invention.

As mentioned above, the dielectric film 31 is formed on the light-incident surface of the phosphor wheel 30, and the phosphor 32 is formed on the light-emission surface of the phosphor wheel 30 concentrically with the phosphor wheel 30. In FIG. 5, a phosphor wheel according to one embodiment is illustrated schematically. FIG. 5A illustrates the light-incident surface of the phosphor wheel 30 and FIG. 5

B illustrates the light-emission surface of the phosphor wheel 30. The green phosphor region, the red phosphor region and the blue-light transmissive region are formed on the phosphor wheel 30. In the green phosphor region, the dielectric film 31G which transmits a blue light and reflects a green light is formed on the light-incident surface side. A green phosphor 32G which has a green light wavelength range is formed on the light-emission surface side. Similarly, in the red phosphor region, the dielectric film 31R which transmits a blue light and reflects a red light is formed on the light-incident surface side, and a red phosphor 32R which has a red light wavelength range is formed on the light-emission surface side. In the blue-light transmissive region, the dielectric film 31B which transmits a blue light is formed on the light-incident surface side, and no phosphor is formed on the light emission surface side. However, the dielectric film 31B which transmits a blue light may be formed on the light-emission surface side as well as on the incident surface side. A light-scattering member such as a particle of $SiO_2$, $TiO_2$, $Ba_2So_4$ or the like is preferably formed thereon in order to improve luminance unevenness and color unevenness.

The dielectric films 31G and 31R formed on the green phosphor region and red phosphor region respectively transmit a blue light and reflects a light of the wavelength corresponding to the color of respective region. Accordingly, a light emitted from the phosphors 32G and 32R in the direction toward the laser diode 12 can be reflected back toward the receiving lens 30 by the dielectric films 31 G and 31R, so that the phosphor can be used efficiently.

The phosphor 32G which is coated on the green phosphor region of the phosphor wheel 30 preferably emits a green light including the wavelength range of 500 to 560 nm. Specific examples of the materials of the phosphor 32G are $\beta\text{-Si}_{6-z}$: $Al_zO_zN_{8-z}$: Eu, $Lu_3Al_5O_{12}$: Ce, $Ca_8MgSi_4O_{16}C_{12}$: Eu, $Ba_3Si_6O_{12}N_2$: Eu, (Sr, Ba, Ca)$Si_2O_2N_2$: Eu.

The phosphor 32R which is coated on the red phosphor region of the phosphor wheel 30 preferably emits a red light including the wavelength range of 600 to 800 nm. Specific examples of the materials of the phosphor 32R are (Sr, Ca) $AlSiN_3$: Eu, $CaAlSiN_3$: Eu, $SrAlSiN_3$: Eu, $K_2SiN_6$: Mn.

The ratio among the green phosphor region, the red phosphor region and the blue-light transmissive region on the phosphor wheel 30 can appropriately be determined. For example, the ratio can be calculated according to the chromaticity of a white light required for a projector and the efficiency of each phosphor or the like. In this embodiment, each of the green phosphor and the red phosphor region has an angle of 150 degrees, and the blue-light transmissive region has an angle of 60 degrees.

While the phosphor wheel 30 has three regions which are for green, red and blue lights, it can have four regions or more. For example, a white light region with blue and yellow light may be further provided. The number of regions for green, red and blue lights can be increased respectively and 2 positions for each color.

Figure 5B:
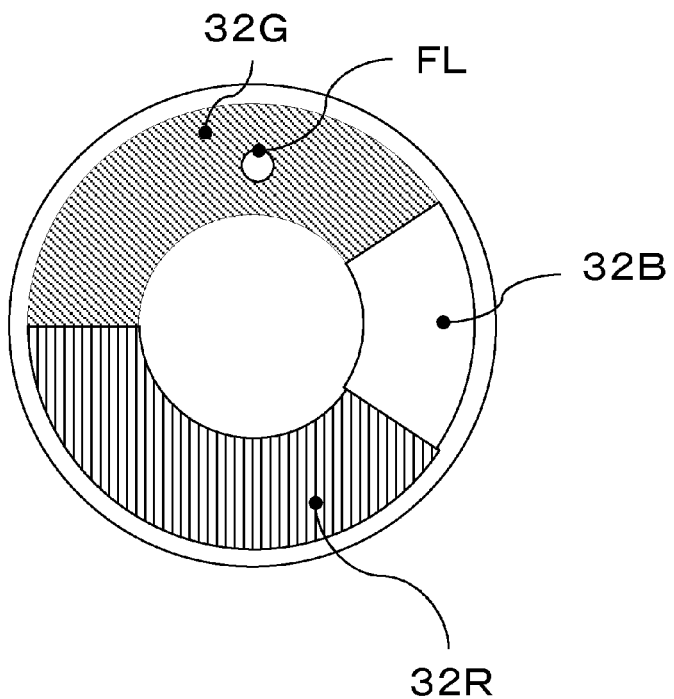

The phosphor wheel 30 is made of a transparent circular plate which transmits a light, and a center of the phosphor wheel 30 is fixed to the rotating axis 50a of the rotary driving apparatus 50. As a material of the phosphor wheel 30, any material having a high light-transmittance, such as glass, resin, sapphire or the like can be used. In FIG. 5A, a position indicated by "SP" shows the position to which a light emitted from the hosing 10 is condensed by the condenser lens 20 (the light condensed position). In FIG. 5B, the position indicated by "FL" shows the position in which the phosphor layer emits when a light is projected from the housing 10 (the phosphor position).

Further, it is also possible to add one more plate at the light-emission surface side and provide a band pass filter thereon. Accordingly, a purer green or red color can be obtained.

Returning to the description of FIG. 1, the rotary driving apparatus 50 is a brushless DC motor, and placed such that the rotating axis 50a thereof and the optical axis 21a of the condenser lens 20 are located in parallel. Further, the rotary driving apparatus 50 is fixed such that the surface of the phosphor wheel 30 is located perpendicularly to the rotating axis 50a. A rotating speed of the rotary driving apparatus 50 is a rotating speed according to a frame rate of moving images (the number of frames per second, a unit [fps]) to be played. For example, in the case where moving images are played at 60 [fps], a rotating speed of the rotary driving apparatus 50 (that is, the phosphor wheel 30) should be determined as integer multiples of 60 rounds per second.

A light which is emitted from the phosphor wheel 30 is condensed by the receiving lens 40 and is outputted from the light source apparatus 1. In the case where the light source apparatus is used for a light source for the projector, a light outputted by the light source apparatus 1 is condensed onto a light modulating device, and the image formed by the light modulating device is enlarged and projected by a projecting device. An etendue which is calculated according to the relationship between the image size formed by the light modulating device and the projecting angle of the light projected by the projecting device is affected by "NA" of the receiving lens 40 and the size of emitting area of the phosphor.

Thus, the following formula is given:

$$\text{(Size of image formed by Light modulating device)} \times \text{(Projecting angle)} = \text{(Phosphor position } FL) \times (NA \text{ of Receiving lens)}$$

Accordingly, since the phosphor emits a light in approximately Lambertian distribution, it is desirable that the light-receiving lens 40 should have higher NA, and the phosphor position FL should be small. If the etendue of the phosphor side is higher than the etendue of the projecting device side, the difference causes reduction of the efficiency.

As mentioned above, since the light-receiving lens 40 has high NA, it is desirable that the phosphor position FL should be as small as possible. In this case, however, a light density of a light from housing 10 may become high. In this embodiment, since it is preferable that the size of the phosphor position FL is preferably around 2 mm, it is preferable that the size of the light condensed position SP should be 2 mm or less. This size is not a size of the light condensed position of a light from each housing 10, but total area of the light condensed positions on the condition that the plurality of housings 10 are fixed.

(Description of Housing)

Next, with referring to FIGS. 1 to 3, the housing according to one embodiment of the invention is described. The description of the housing includes a description of a first embodiment and a description of a second embodiment. In the first embodiment, incident angles of the lights which is emitted from the housings 10 to the optical axis of the condenser lens 20 are made different by varying a mount angle of each housing 10 with respect to the heat dissipation plate (supporting member) 60. In the second embodiment, a location of the collimating lens 13 to the laser diode 12 is shifted from the position of the collimating lens 13 (focusing position) to emit a collimated light.

(Description of First Embodiment)

At first, the first embodiment of the present invention relating to the housing is described with referring to FIGS. 1 to 3. As illustrated in FIG. 1A, the laser diodes 12 are aligned in a short axis (X axis) of a far field pattern of a diffused light emitted from the laser diode 12, and the mount angle of the housing 10 is varied by rotating around a long axis (Y axis) of a far field pattern of the laser diode 12. In FIG. 1A, the vertical direction in the drawing corresponds to Y axis direction. In an explanatory diagram of axis (refer to FIG. 1B) which is seen from the arrow A-A in FIG. 1A, the short axis (X axis) and the long axis (Y axis) in the far field pattern are illustrated.

In FIG. 1A, four light sources (pairs of the laser diode 12 and the collimating lens 13) are aligned in the short axis (X axis) in one line. However the number of the line not limited thereto, and it is possible to have a configuration having two lines where four light sources are aligned in the short axis (X axis) respectively, and further a configuration having 3 lines or more is also possible.

As mentioned above, the mount angle of the housing 10 is changed as rotating around the long axis (Y axis) from the direction that a light emits from the housing 10 in parallel to the optical axis of the condenser lens 20. Therefore, the light which is emitted from the housing 10 enters the condenser lens 20 with an incident angle corresponding to the mount angle (slanted angle). Thus, the light enters the condenser lens 20 with the angle corresponds to the mount angle (slanted angle) with respect to the optical axis 21. As the mount angle (slanted angle), that is, the incident angle (the angle with respect to the optical axis of the condenser lens 20), 0.25 to 2 degrees are preferable as absolute values.

In the case where lights which are emitted from the housings 10 enter the condenser lens 20 in parallel to the optical axis of the condenser lens 20, the lights are condensed onto the point on the optical axis 21. On the contrary, in the case where the lights enter the condenser lens 20 with a predetermined incident angle, the lights are condensed onto the different positions as illustrated in FIG. 1A. Therefore, in the case where the mount angle of each housing 10 is made different, a light emitted from each housing 10 is condensed onto every different point. In this case, however, setting the mount angle (slanted angle) to be in the range from 0.25 to 2 degrees as absolute values allows the area of the light condensed position SP (refer to FIG. 5A) not to become so large on the phosphor wheel 30.

Next, with referring to FIG. 2, one embodiment in which the housings 10 are mounted with being inclined on the heat dissipation plate 60 which is a supporting member is described.

Figure 2A:
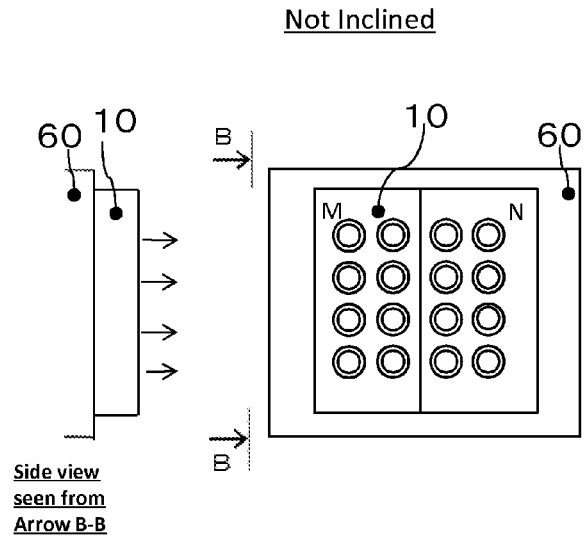
FIGS. 2A to 2C illustrate a schematic diagram for describing a light source apparatus according to a first embodiment of the present invention, in which mounted surfaces of the housings are slanted.
Figure 3A:
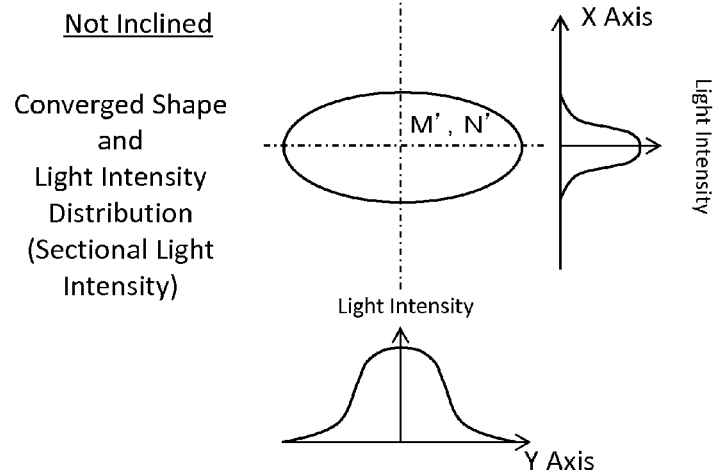
FIGS. 3A to 3C illustrate a figure for describing a shape and a light intensity distribution (sectional light intensity) of the light condensed position in the first embodiment.

FIG. 2A illustrates two housings 10 which respectively have two lines of light sources in which four light sources are aligned in the short axis (X axis which extends up and down direction in the drawing). Such two housings 10 are placed being adjacent to each other (refer to M and N), and the two housings 10 indicated by M and N are mounted on the heat dissipation plate 60 without being inclined. Thus, as illustrated in the side view shape which is seen from the arrow B-B of FIG. 2A, the housing 10 has a rectangular side shape, and the mounted surface and the light-emitting surface of the housing 10 is arranged in parallel to the mounting surface of the heat dissipation plate 60. Therefore, arranging the mounting surface of the heat dissipation plate 60 perpendicularly to the optical axis of the condensed lens 20 allows a light exists from the housing 10 in parallel to the optical axis of the condensed lens 20. A condensed shape (refer to M' and N'') of the light condensed position SP of the light condensed by the condenser lens 20 and a light intensity distribution (sectional light intensity) of the light condensed position SP are shown by a shape and a graph in FIG. 3A. The condensed shape M' from the housing 10 indicated by M, and the condensed shape N' from the housing 10 indicated by N are overlapped. As shown in the graph of FIG. 3A, the lights which are emitted from the two housings 10 are condensed onto one point. Therefore, it shows a high peak of the light intensity both in the short axis (X axis) and the long axis (Y axis), and it shows that the light density of the light condensed position SP is high.

Returning to FIG. 2A-2C, in FIG. 2B, the two housings 10 which respectively have two lines of light sources in which four light sources are aligned in the short axis (that is, X axis/up and down direction in the drawing). Such two housings 10 are placed being adjacent to each other (refer to P and Q), and the two housings 10 indicated by P and Q have the same shapes, and have the side view shape in which the mounted surface to the heat dissipation plate 60 is slanted. In the case of the housing as indicated by P, as illustrated in the side view shape which is seen from the arrow C-C of FIG. 2B, the housing 10 has a shape in which the mounted surface to the heat dissipation plate 60 is slanted with a predetermined angle. While it is preferable that the slant angle should ranges from 0.25 to 2 degrees, as mentioned above, FIGS. 2A to 2C actually emphasizes the slant angle. Accordingly, in the case where the mounting surface of the heat dissipation plate 60 is arranged perpendicularly to the optical axis of the condensed lens 20, a light which is emitted from the housing 10 indicated by P enters the condensed lens 20 with a certain incident angle corresponding to the predetermined slant angle. Thus, the light enters the condensed lens 20 with the predetermined angle to the optical axis 21. The light is emitted downward from the housing 10 as indicated by P in comparison with the perpendicular direction to the drawing which corresponds to the direction of the optical axis 21 of the condenser lens 20.

On the contrary, in the case of the housing 10 indicated by Q, which has the same shape (the shape in which the mounted surface is slanted with the predetermined angle) with the housing 10 indicated by P, the housing 10 indicated by Q is fixed with rotating by 180 degrees to the housing 10 indicated by P around the approximately optical axis of the light which is emitted from the housing 10. Accordingly, the light is emitted upward from the housing 10 indicated by Q in comparison with the perpendicular direction to the drawing which corresponds to the direction of the optical axis 21 of the condenser lens 20. The light enters the condenser lens 20 with the incident angle corresponding to the predetermined angle with respect to the optical axis 21 of the condenser lens 20 (this, the light enters the condenser lens 20 with the predetermined angle with respect to the optical axis 21).

Figure 3B:
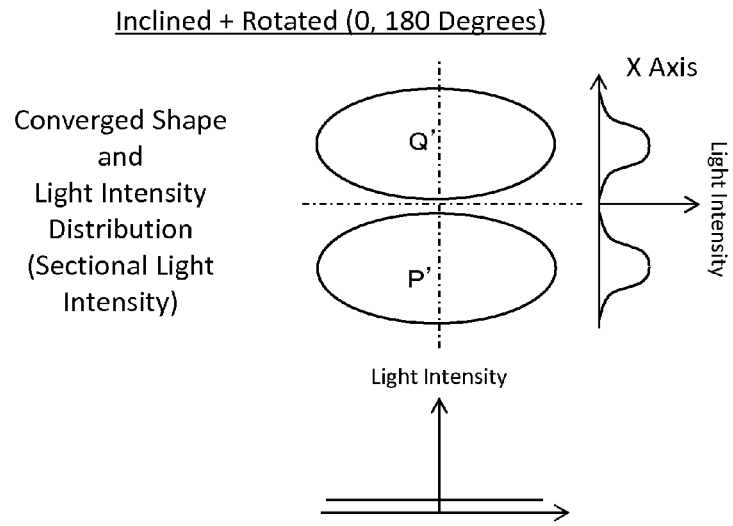

A condensed shape (refer to P' and Q') of the light condensed position SP formed by the condensed light from the condenser lens 20 and a light intensity distribution (sectional light intensity) of the light condensed position SP in this case are shown by a shape and a graph in FIG. 3B. A light from the housing 10 as indicated P is condensed at the lower position of the drawing to form the condensed shape P', and a light from the housing 10 as indicated Q is condensed at the upper position of the drawing to form the condensed shape Q'. Since the lights which is emitted from the two housings 10 are condensed onto two positions separately, not condensed onto one position, it shows two peaks of the light intensity in the short axis (X axis), as illustrated in FIG. 3B. Accordingly, the peak light intensity in this case is lower than the case as shown in FIG. 3A.

With the peak light intensity $P_0$ In the case of single converging position in FIG. 3A, the peak light intensity P in FIG. 3B to be: $P=P_0/2$, in the case of two converging positions. Thus, since the peak light intensity becomes the value to be calculated such that the peak light intensity $P_0$ is divided by the number of condensed positions, the value of the case of FIG. 3B becomes a half of the original peak light intensity.

Figure 2B:
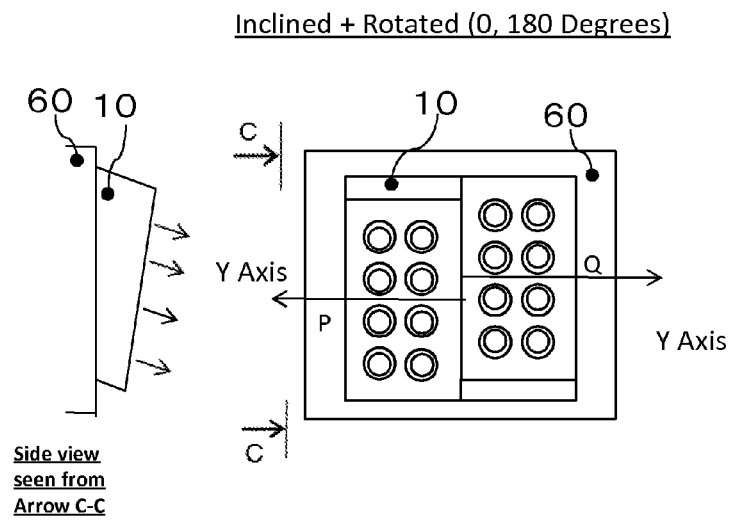

The light intensity is almost even in the long axis (Y axis). Therefore, the light density of the housings 10 as shown in FIG. 2B is lower than that of the housings 10 as shown in FIG. 2A, in which the housings 10 is mounted without being inclined. In the direction of the long axis (Y axis), it may have the Gaussian distribution according to the distance between the housing 10 indicated by P and the housing indicated by Q.

Figure 2C:
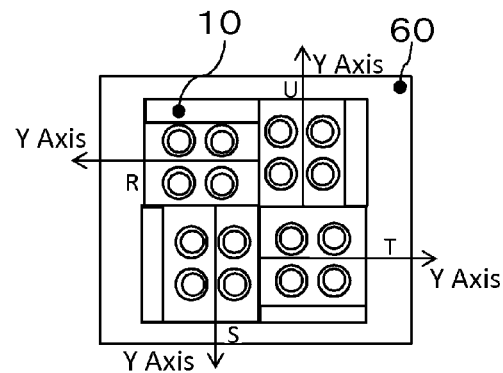

Returning to FIG. 2, in FIG. 2C, the four housings 10 which respectively have two lines of light sources in which two light sources are aligned in the short axis (that is, X axis/up and down direction in the drawing). Such four housings 10 are placed being adjacent to one another (one housing is adjacent to two housings; refer to R, S, T and U), and the four housings 10 indicated by R, T, S and U have the same shapes, and have the side view shape in which the mounted surface to the heat dissipation plate 60 is slanted with a predetermined angle. In the case that the housing 10 indicated by R is determined as a basis, the housing 10 indicated by S, T and U are fixed with rotating by 90, 180 and 270 degrees in the anticlockwise rotation relative to the housing 10 as indicated by R approximately around the optical axis of the light emitted from the housing 10. Accordingly, if the mounting surface of the heat dissipation plate 60 is arranged perpendicularly to the optical axis of the condensed lens 20, the light is emitted downward from the housing 10 indicated by R in comparison with the perpendicular direction to the drawing which corresponds to the direction of the optical axis 21 of the condenser lens 20. The light is emitted rightward from the housing 10 indicated by S in comparison with the perpendicular direction to the drawing which corresponds to the direction of the optical axis 21 of the condenser lens 20. The light is emitted upward from the housing 10 indicated by T in comparison with the perpendicular direction to the drawing which corresponds to the direction of the optical axis 21 of the condenser lens 20. The light is emitted leftward from the housing 10 as indicated by U in comparison with the perpendicular direction to the drawing which corresponds to the direction of the optical axis 21 of the condenser lens 20. In every case, the light enters the condenser lens 20 with the incident angle corresponding to the predetermined angle with respect to the optical axis 21 of the condenser lens 20 (thus, the light enters the condenser lens 20 with the predetermined angle to the optical axis 21).

Figure 3C:
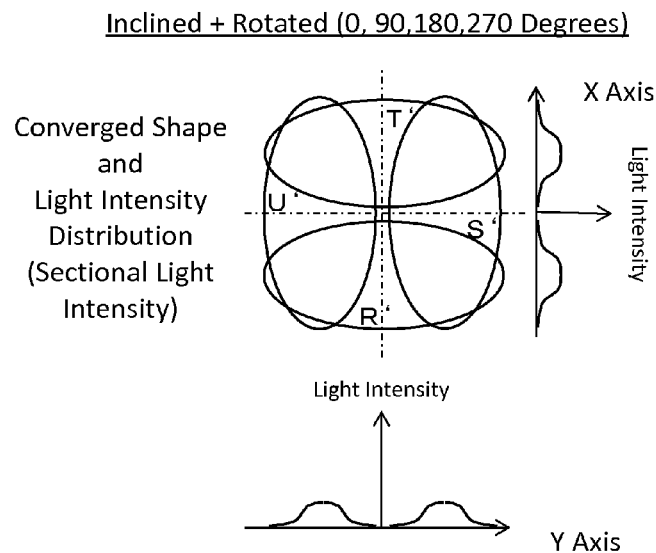

In this case, a condensed shape (refer to R', S', T' and U') of the light condensed position SP formed by the condensed light from the condenser lens 20 and a light intensity distribution (sectional light intensity) on the light condensed position SP are shown by a shape and a graph in FIG. 3C. A light from the housing 10 indicated by R is condensed at the lower position of the drawing and to form the condensed shape R'. A light from the housing 10 indicated by S is condensed at the right side position of the drawing to form the condensed shape S'. A light from the housing 10 indicated by T is condensed at the upper position of the drawing to form the condensed shape T'. A light from the housing 10 indicated by U is condensed at the left side position of the drawing to form the condensed shape U'. Since the lights which is emitted from the four housings 10 are condensed onto four positions (R', S', T' and U') separately, not condensed onto one position, it shows respectively two peaks of the light intensity both in the short axis (X axis) and in the long axis (Y axis), as illustrated in FIG. 3C. With the peak light intensity $P_0$ in the case of single converging position in FIG. 3A, the peak light intensity P in FIG. 3C to be: $P=P_0/4$, in the case of four converging positions. That is, since the peak light intensity becomes the value to be calculated such that the peak light intensity $P_0$ in the case of single converging position is divided by the number of condensed positions, the value of the case of FIG. 3C becomes a quarter of the original peak light intensity.

Therefore, the light density of FIG. 3C corresponding to the housings 10 as shown in FIG. 2C is much lower than the light density of FIG. 3A corresponding to the housings 10 as shown in FIG. 2A, and lower than the light density of FIG. 3B corresponding to the housings 10 as shown in FIG. 2B. Thus, the light density of the housings 10 of FIG. 2C becomes much lower than the housings 10 of FIG. 2A which is mounted without being inclined.

The light intensity is the lowest in the embodiment as shown in FIG. 2 C (refer to the graph of FIG. 3 C). However, even in the embodiment as shown in FIG. 2 B (refer to the graph of FIG. 3 B), the light intensity is also low enough in comparison with the case of FIG. 2 A (refer to the graph of FIG. 3 A), and it can sufficiently suppress the degradation of the emission efficiency of phosphor.

As mentioned above, in this embodiment, in the case that the plurality of housings are fixed to the same heat dissipation plate (supporting member) 60, since the mount angles of the housings 10 to the heat dissipation plate (supporting member) 60 differ from each other, their incline angles with respect to the optical axis of the condenser lens 20 are different respectively. Therefore, the lights emitted from the plurality of housings are condensed onto the phosphor wheel 30 by the condenser lens 20, the lights are condensed at the different positions on the phosphor of the phosphor wheel 30. Therefore, the light density can sufficiently be lowered, and the light emitted from the phosphor can be utilized efficiently.

Further, since the above mentioned effect is realized only by varying the mount angles to the heat dissipation plate (supporting member) 60, the light source apparatus 1 can be manufactured without lowering productivity.

Accordingly, it is possible to provide the light source apparatus 1 which can suppress degradation of the emission efficiency of phosphor as much as possible, and can be manufactured without lowering the productivity while achieving simple assembly.

In the housing 10, since each light source is aligned in the short axis (X axis) of the far field pattern, and the mount angle of each housing 10 is varied in the direction of rotating around the long axis (Y axis) of the far field pattern, it can prevent a light which is emitted from each light source 10 from interfering with others, and it can adequately lower the light density at the light condensed position SP.

Further, by simply making slanted the mounted surfaces of the housings 10 to the heat dissipation plate (supporting member) 60, the light density at the light condensed position SP can securely be suppressed, and the light source apparatus 1 can be manufactured without lowering the productivity.

Specifically, fixing the housings having slanted mounted surfaces and having the same shape with each other to heat dissipation plate (supporting member) 60 so as to rotate by 180 degrees to each other, (in other words, so as to rotate by 180 degrees in the same rotating direction, the incident angle of the light which is emitted from each housing 10 to the optical axis of the condenser lens 20 can be made different. Therefore, it can certainly lower the light density at the light condensed position SP with using very simple configuration.

Specifically, fixing the housings having slanted mounted surfaces and having the same shape with each other to heat dissipation plate (supporting member) 60 so as to rotate by 90 degrees to others, (in other words, so as to rotate by 90, 180, 270 degrees in the same rotating direction), the incident angle of the light emitted from each housing 10 to the optical axis of the condenser lens 20 can be made different. Therefore, it can securely lower the light density at the light condensed position SP with using very simple configuration.

Setting the slant angle of the mounted surface of the housings 10 to the mounting surface of the heat dissipation plate (supporting member) 60 to be in the range from 0.25 to 2 degrees, the light density can be lowered without enlarging the area of the light condensed position SP so much.

Further, since the heat dissipation member 60 is used as a supporting member, the housing 10 can be cooled efficiently, and it can facilitate downsizing of the light source apparatus 1 with reducing the number of components.

<Description of Alternative of First Embodiment>

While the mounted surface of the housing 10 to the mounting surface of the heat dissipation member 60 is slanted in the above mentioned embodiment, it is not limited thereto, and it is also possible that the mounting surface of the heat dissipation member 60 which is a supporting member is slanted and thereby varying the incident angle of the light which is emitted from each housing 10 with respect to the optical axis of the condenser lens 20. In this case, the mounted surface of the housing 10 is not slanted, and it can have a rectangular side shape.

Therefore, once the heat dissipation member 60 as a supporting member is formed as mentioned above, a shape of the housing 10 can be simplified so that the housing 10 can be replaced easily with a low cost at the time of maintenance or the like.

While the heat dissipation member 60 is used as a supporting member to which the housing 10 is fixed in the above mentioned embodiment, it is not limited thereto, and any member can be used as a supporting member according to intended use.

(Description of Second Embodiment)

Next, a second embodiment relating to the housing is described with referring to FIG. 4. In this embodiment, in the light source, a location of the collimating lens 13 to the laser diode 12 is shifted from the position of the collimating lens for emitting a light in parallel. FIG. 4A illustrates the case that the collimating lens 13 is located at the focusing position that a collimated light is emitted from the collimating lens 13. FIG. 4B illustrates the case that the collimating lens 13 is located closer to the laser diode 12 by about 0.2 mm in comparison with the focusing position that a light is emitted from the collimating lens 13 in parallel. That is, the distance between the collimating lens 13 and the laser diode 12 is shorter by about 2 mm than the case that the collimating lens 13 is located at the focusing position. In both cases as illustrated in FIGS. 4A and 4B, the housing 10 is configured to be fixed to the heat dissipation member (supporting member) 60 with being inclined by the predetermined angle, as described with referring to FIGS. 1 and 2.

The shift length of the collimating lens 13 from the focusing point preferably ranges from 0.1 to 0.5 mm. While the collimating lens 13 is shifted to the laser diode 12 side in FIG. 4B, it is also possible that the collimating lens 13 is shifted to the condenser lens 20 side.

Figure 4A:
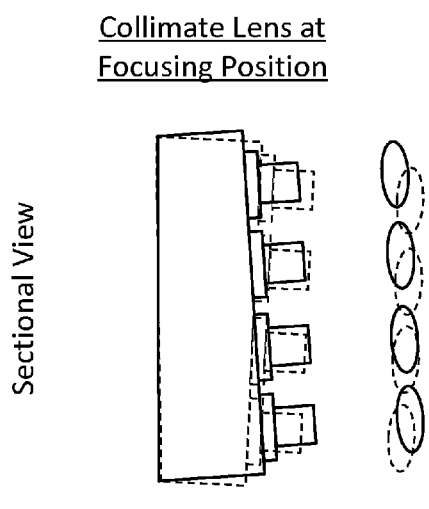
FIGS. 4A to 4D illustrate a schematic diagram for describing a light source apparatus according to a second embodiment of the present invention in which positions of the collimating lenses are shifted, and a figure for describing a shape and a light intensity distribution (sectional light intensity) of the light condensed position.
Figure 4B:
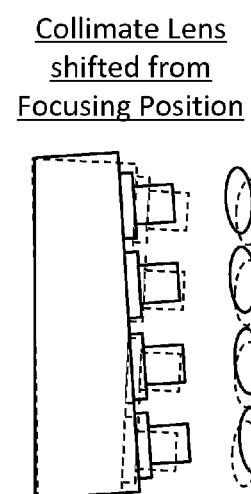

In the arrangement as illustrated in FIGS. 4A and 4B, a condensed shape of the light condensed position SP formed by the condensed light from the condenser lens 20 and a light intensity distribution (sectional light intensity) of the light condensed position SP are shown in FIGS. 4 C and 4 D.

Figure 4C:
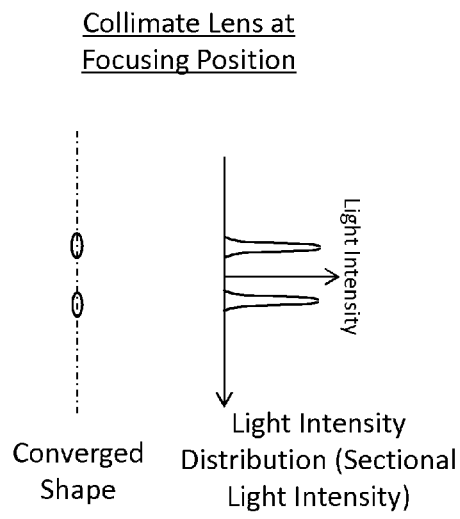
Figure 4D:
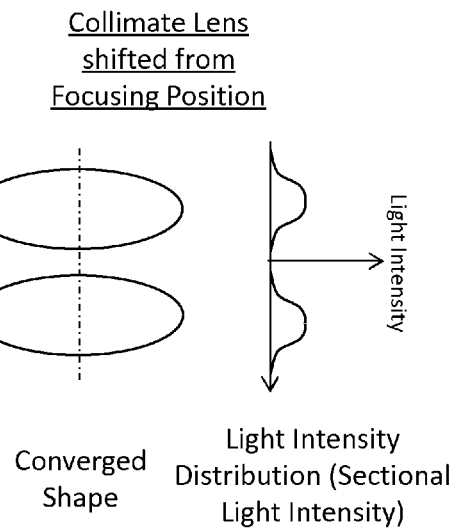

FIG. 4C illustrates the condensed shape and the light intensity distribution (sectional light intensity) in the case that the collimating lens 13 is located at the focusing position, and FIG. 4D illustrates the condensed shape and the light intensity distribution (sectional light intensity) in the case that the collimating lens 13 is shifted from the focusing position.

Comparing the case that the collimating lens 13 is located at the focusing position as illustrated in FIG. 4C and the case that the collimating lens 13 is shifted from the focusing position as illustrated in FIG. 4D with each other, the area of the light condensed position SP in the case of FIG. 4D is larger than that in the case of FIG. 4C, and the peak optical intensity in the case of FIG. 4D is lower than that in the case of FIG. 4C.

With the peak light intensity $P_0$ of the light condensed position SP in the case that the collimating lens 13 is located at the focusing position, the peak light intensity P' at the light condensed position SP in the case that the collimating lens 13 is shifted from the focusing position to be $P'=P_0/(\pi r_0^2/\pi r^2)$. Where "$r_0$" is a radius of the light condensed diameter of the light condensed position SP in the case that the collimating lens 13 is located at the focusing position, "r" is a radius of the light condensed diameter of the light condensed position SP in the case that the collimating lens 13 is shifted from the focusing position.

The radius of the light condensed diameter in FIG. 4C is about 0.1 mm, and the radius of the light condensed diameter in FIG. 4D is about 1 mm. Therefore, the peak light intensity in the case that the collimating lens 13 is shifted from the focusing position becomes $\frac{1}{100}$ in comparison with the case that the collimating lens 13 is located at the focusing position.

Even in the cases as illustrated in FIGS. 4A and 4C, the housings 10 are configured to be fixed to the heat dissipation member 60 as a supporting member with being inclined with the predetermined angle, so that the light density at the light condensed position SP formed by the light from the plurality of the housings 10 can be reduced. In the cases as illustrated in FIGS. 4B and 4D, the light density can be further reduced as mentioned below.

In each light source, in the case that the location of the collimating lens 13 to the laser diode 12 is shifted from the focusing position, a light emitted from the collimating lens 13 becomes different from the parallel light, so that the area of the light condensed position on the phosphor can be enlarged as well as that the shift of the condensed positions formed by the lights from the plurality of the laser diodes 12 can be reduced.

Thus, while lights which is emitted from the laser diodes 12 placed in the same housing 10 are condensed onto the approximately same place, the light intensity can be lowered by enlarging the area of the light condensed position. That is, since a light intensity of the light condensed position can be lowered, a light which is emitted from the phosphor can be used efficiently. At the same time, since a position of the light condensed position formed by the light from each laser diode 12 placed in the same housing 10 is not shifted so much, increase of the area of total condensed positions can be adequately suppressed.

(Description of Combination of First Embodiment and Second Embodiment)

Figure 6:
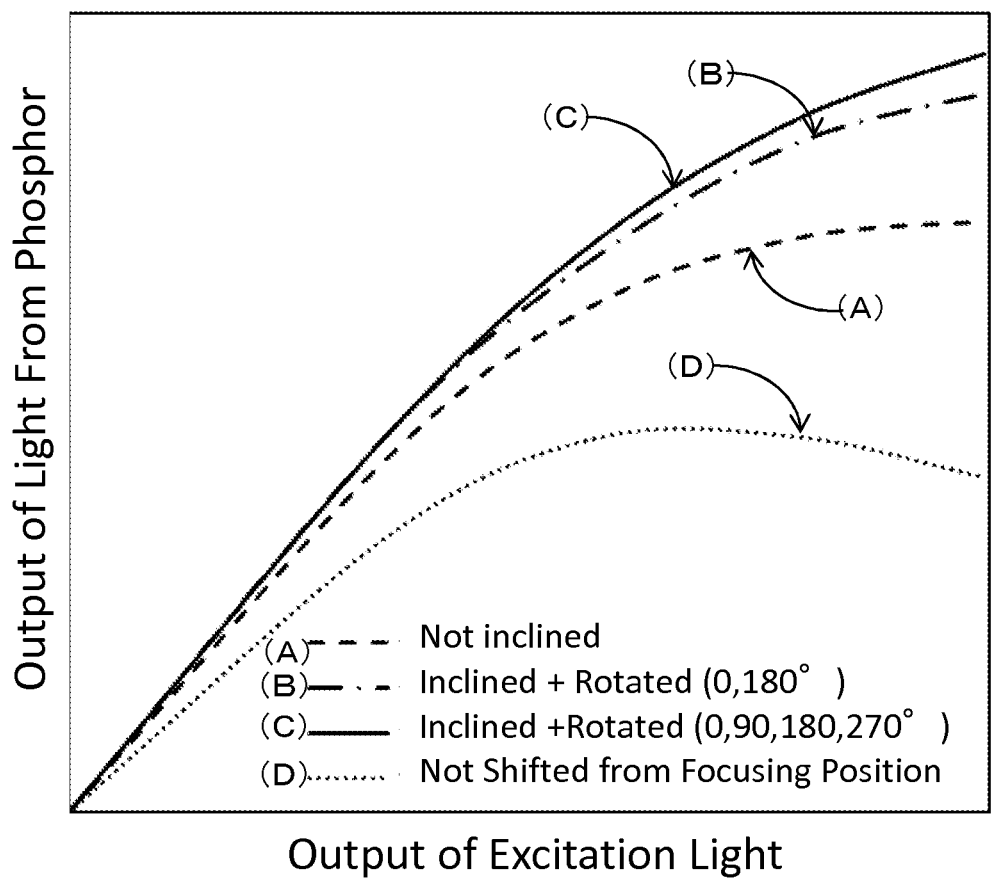
FIG. 6 illustrates a graph for describing a light intensity of the phosphor in the case of combining the first and second embodiments and a light intensity of the phosphor in other cases.

Next, an optical output from the phosphor by combining the first embodiment that the mount angle of the housing 10 is varied, and the second embodiment that the collimating lens 13 is shifted from the focusing position is described with referring to a graph of FIG. 6.

The graph of FIG. 6 illustrates relationship between an optical output of the light from the phosphor and an optical output of the excitation light. A dotted line indicated by (A) shows an output from the phosphor according to the embodiment of combining the embodiment as illustrated in FIG. 2A that the housing 10 is not inclined, and the embodiment as illustrated in FIG. 4B that the collimating lens 13 is shifted from the focusing position.

A dashed line indicated by (B) shows an output from the phosphor according to the embodiment of combining the embodiment that the housing 10 is inclined and rotated as illustrated in FIG. 2B, and the embodiment as illustrated in FIG. 4B that the collimating lens 13 is shifted from the focusing position.

A solid line indicated by (C) shows an output from the phosphor according to the embodiment of combining the embodiment as illustrated in FIG. 2C that the housing 10 is inclined and rotated, and the embodiment as illustrated in FIG. 4B that the collimating lens 13 is shifted from the focusing position.

A small dotted line indicated by (D) shows an output from the phosphor according to the embodiment of combining the embodiment as illustrated in FIG. 2A that the housing 10 is not inclined, and the embodiment as illustrated in FIG. 4A that the collimating lens 13 is located at the focusing position.

As indicated by the small solid line (D), in the case of the embodiment that the housing 10 is not inclined as illustrated in FIG. 2(*a*) and the collimating lens 13 is located at the focusing position as illustrated in FIG. 4A, if the optical output of the excitation light is increased, the output of the light from the phosphor reaches the peak and then gradually reduces.

As indicated by the dotted line (A), in the case of the embodiment that the housing 10 is not inclined as illustrated in FIG. 2A, and the collimating lens 13 is shifted from the focusing position as illustrated in FIG. 4B, if the output of the excitation light is increased, the output of the light from the phosphor is also increased, but gradually saturated.

On the contrary, as indicated by the dashed line (B) or the solid line (C), in the embodiment that the housing 10 is inclined and rotated as illustrated in FIG. 2B or 2C and the collimating lens 13 is shifted from the focusing position as illustrated in FIG. 4B, the effect as shown in FIG. 3B or 3C and the effect as shown in FIG. 4B allows for suppressing the saturation of the optical output of the light from the phosphor, and thus the phosphor can be used effectively even if an output from the housing 10 is high. It is because the light density can be lowered at the light condensed position SP, and thus the degradation of the emission efficiency of phosphor can be sufficiently suppressed. The phosphor can be used more efficiently in the embodiment as indicated by the solid line (C) corresponding to FIG. 2C and FIG. 3C in comparison with the graph of the dashed line (B). However, even in the case of the dashed line (B) corresponding to FIG. 2B and FIG. 3B, it clearly shows a high performance relating to the optical output of the light from the phosphor.

Accordingly, combining the above mentioned first embodiment and the above mentioned second embodiment allows lights emitted from the plurality of housings 10 to be condensed onto different positions respectively and the area of the light condensed position of the light from each housing 10 to be large enough, so that the light density can sufficiently be lowered and the degradation of the emission efficiency of phosphor can be sufficiently suppressed.

As mentioned above, in the light source apparatus 1 according to the embodiment of the present invention, by placing the housing 10 with inclining and rotating the mounted surface of the housing 10, the positions of the light condensed positions of the light which is emitted from the plurality of housing 10 are varied, and thereby lowering the light density at the light condensed position SP. Further, by shifting the location of the collimating lens 13, the shape of the light condensed position SP of the phosphor can be enlarged without loss of the etendue, and thus the light density at the light condensed position SP can be lowered. Accordingly, it can sufficiently suppress the degradation of the emission efficiency of phosphor, and the phosphor can be used efficiently. Further, since the plurality of housings 10 having the same shape can be incorporated with changing its arrangement, the productivity can be prevented from being lowered.

The number of the housing 10 is not limited to that of the above mentioned embodiments, but can be any number as long as the number is 2 or more. The number of the laser diode 12 in the housing 10 can be any number as long as the number is 2 or more. Further, in the above mentioned embodiments, while one collimating lens 13 corresponds to one laser diode 12, for example, a lens array can be applied.

(Description of Projector)

Figure 7:
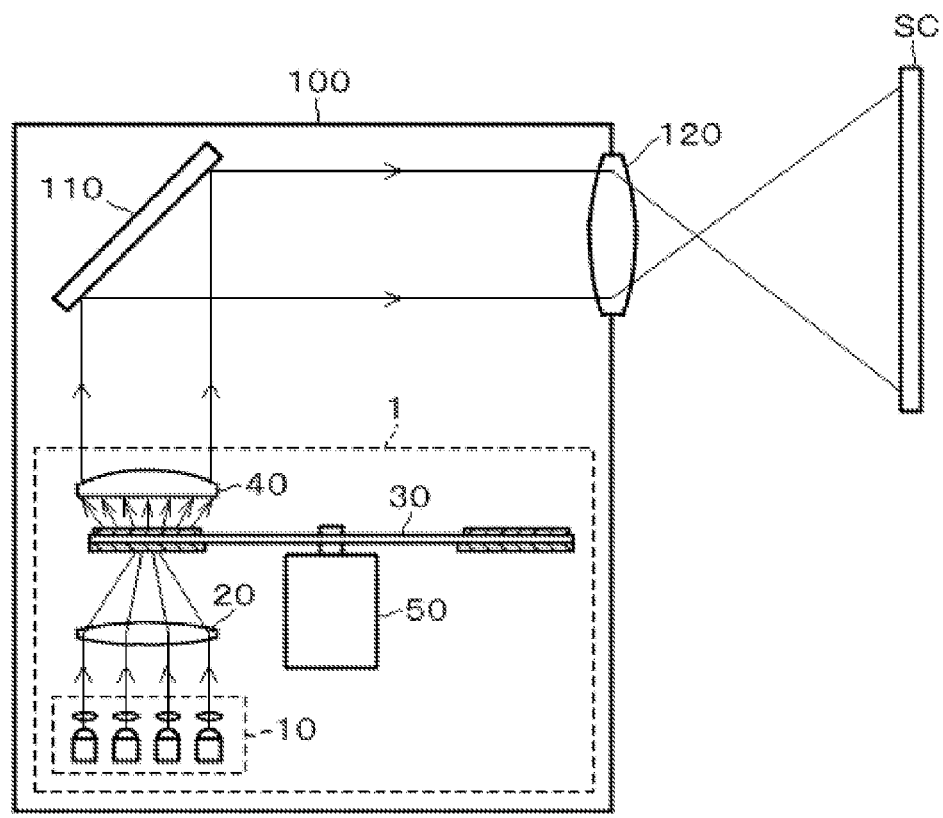
FIG. 7 illustrates a schematic diagram for describing a configuration of a projector according to one embodiment of the invention, which includes the above mentioned light source apparatus.

Next, a case that the above mentioned light source apparatus 1 is used as a light source apparatus for the DLP projector of one-chip type is described with referring to FIG. 7. FIG. 7 illustrates a schematic diagram for describing a configuration of a projector 100 having the light source apparatus 1 according to the above mentioned embodiments, and it is schematic plain view seeing the light source apparatus 1 and the projector 100 from the above. In the light source apparatus 1, there are two housings 10 being adjacent to each other, and one housing 10 is inclined upward and another housing 10 is inclined downward. Such arrangement allows the incline angles of the lights emitted from the two housings 10 with respect to the optical axis of the condenser lens 20 to be made different from each other. The number of the housings 10 is not limited to 2, but any number of the housings 10 as mentioned above can be provided.

In FIG. 7, the light which is emitted from the light source apparatus 1 is reflected by DMD element (Digital Micromirror Device) 110 which is a light modulating element, the reflected light forms an image, and thereby forming the images, and then the image is enlarged and projected to the screen SC by a projecting lens 120 which acts as a projecting device. In the DMD element 110, micro mirrors which correspond to each pixel of the images projected on the screen are arranged in matrix. The light projected to the screen can be on/off controlled in micro seconds by changing the inclined angle of each of the micro mirrors.

Further, it can change the intensity of the light which enters the projecting lens 120 according to the ratio between the on time of each micro mirror and the off time of each micro mirror, and thus achieving the gradation display based on the image data projected to the screen.

While the DMD element is used as a light modulating element in this embodiment, it is not limited thereto, and any other light modulating element can be applied according to intended use. A light source apparatus and a projector according to the present invention are not limited to the above mentioned embodiments, but various other embodiments are included in the present invention.

While the present invention has been described according to the embodiments with a certain degrees of details, contents of disclosure of the embodiments shall be varied in details of the configuration, and the combination of elements and the change of order in the embodiment can be realized without deviating from the scope of the claims and concepts of the present invention.

DESCRIPTION OF REFERENCE NUMBERS

1 Light Source Apparatus
10 Housing
11 Main body of Housing
12 Laser diode
13 Collimating lens
14 Optical Axis of Laser diode
20 Condenser lens
21 Optical Axis of Condenser lens
30 Phosphor Wheel
31 Dielectric Film
32 Phosphor
40 Receiving Lens
50 Rotary Driving Apparatus
50a Rotating axis
60 Heat dissipation plate (Supporting Member)
100 Projector
110 DMD Element
120 Projecting Lens
SC Screen
SP Light Condensed Position
FL Phosphor Position

What is claimed is:

1. A light source apparatus comprising:
a plurality of light sources each including a laser diode and a collimating lens, said collimating lens making a light emitted from said laser diode into an approximately collimated beam,
a plurality of housings in which said plurality of light sources are placed so that each light emitted from each of said light source advances approximately in parallel in the same direction,
a condenser lens which condenses lights emitted from said plurality of housings to a phosphor,
a phosphor wheel having said phosphor, said phosphor wheel transmitting a light which is emitted from said condenser lens,
wherein incident angles of the lights emitted from said housings to an optical axis of said condenser lens are made different by varying mount angles of said housings to a supporting member.

2. The light source apparatus according to claim 1, wherein, in said light source, a location of said collimating lens to said laser diode is shifted from a position of said collimating lens to emit the substantially collimated light.

3. The light source apparatus according to claim 1, wherein, in said housing, said light sources are aligned in a short axis of a far field pattern of said laser diode, and the mount angles of said housings are varied in the direction of rotating around a long axis of a far field pattern of said laser diode.

4. The light source apparatus according to claim 1, wherein said housings are mounted on the same supporting member, and mounted surfaces of said housings to said supporting member are slanted.

5. The light source apparatus according to claim 4, wherein two of said housings being adjacent to each other are fixed to said supporting member with rotating by 180 degrees to each other approximately around an optical axis of the light which is emitted from said housings.

6. The light source apparatus according to claim 4, wherein four of said housings being adjacent to one another are fixed to said supporting member with rotating by 90 degrees to one another around approximate an optical axis of the light which is emitted from said housings.

7. The light source apparatus according to claim 1, wherein said housings are mounted on the same supporting member, and a mounting surface of said supporting member on which said housings are mounted is slanted.

8. The light source apparatus according to claim 4, wherein the slant angle of the mounted surface of said housing or the mounting surface of said supporting member is in a range from 0.25 to 2 degrees.

9. The light source apparatus according to claim 1, wherein the supporting member works as a heat dissipation member.

10. The light source apparatus according to claim 1, wherein the wavelength of lights emitted from said housings ranges from 370 to 500 nm.

11. The light source apparatus according to claim 1, wherein one of said phosphors is a phosphor which emits a light including a red light.

12. A projector comprising:
the light source apparatus according to claim 1,
a light modulating device which modulates lights emitted from the light source apparatus in the plurality of wavelength ranges to form an image based on an image data,
a projecting device which enlarges and projects the image.

* * * * *